UNITED STATES PATENT OFFICE.

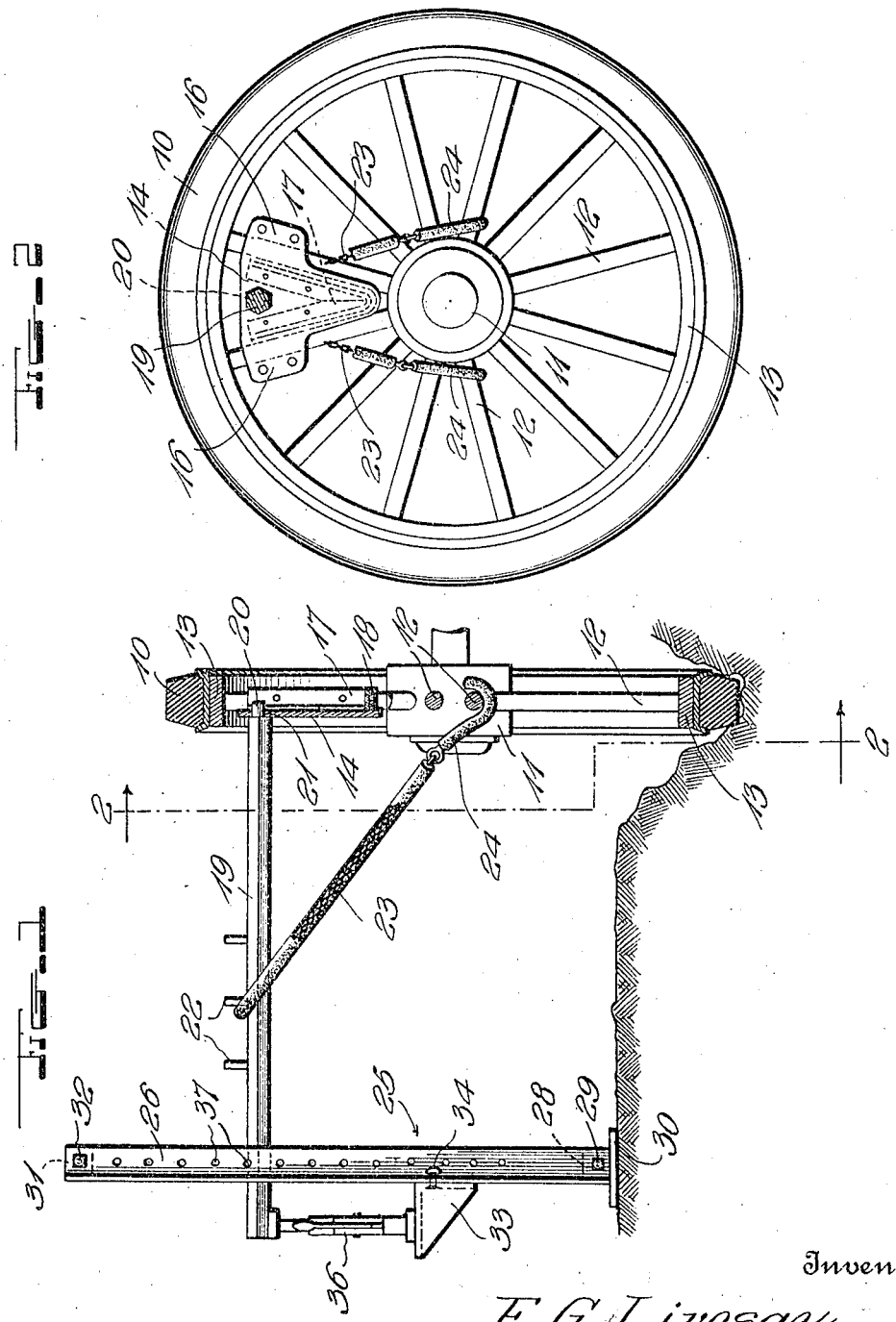

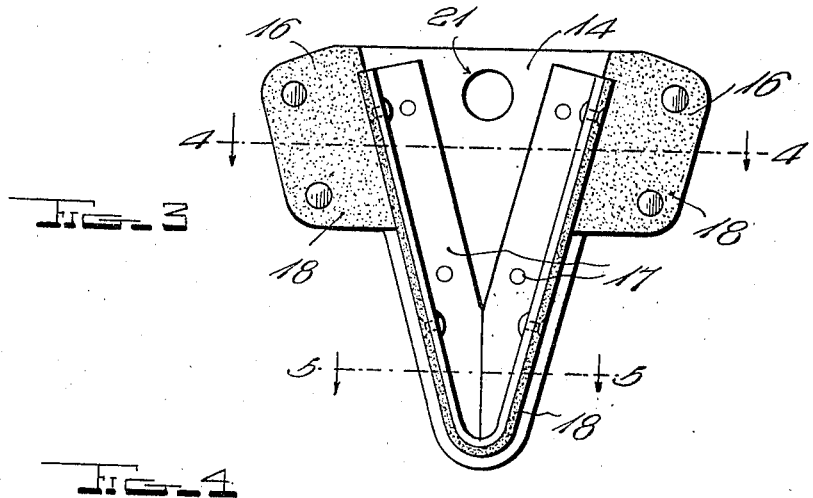
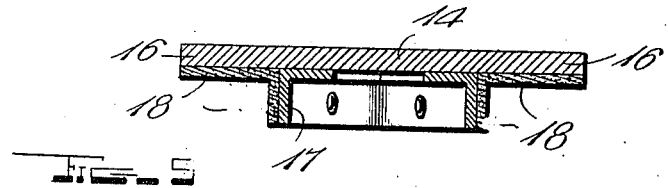
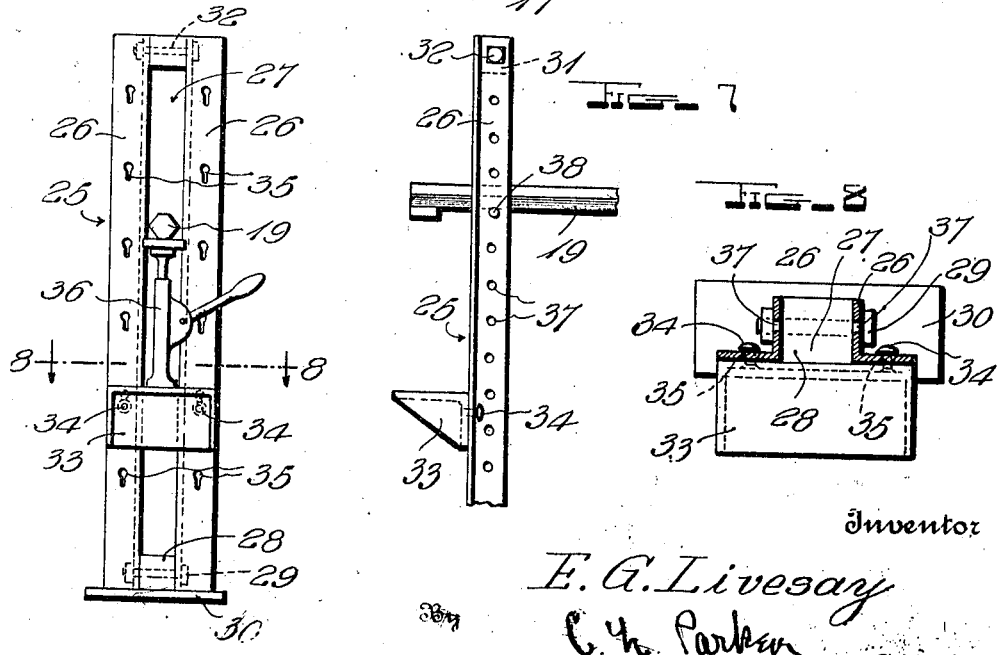

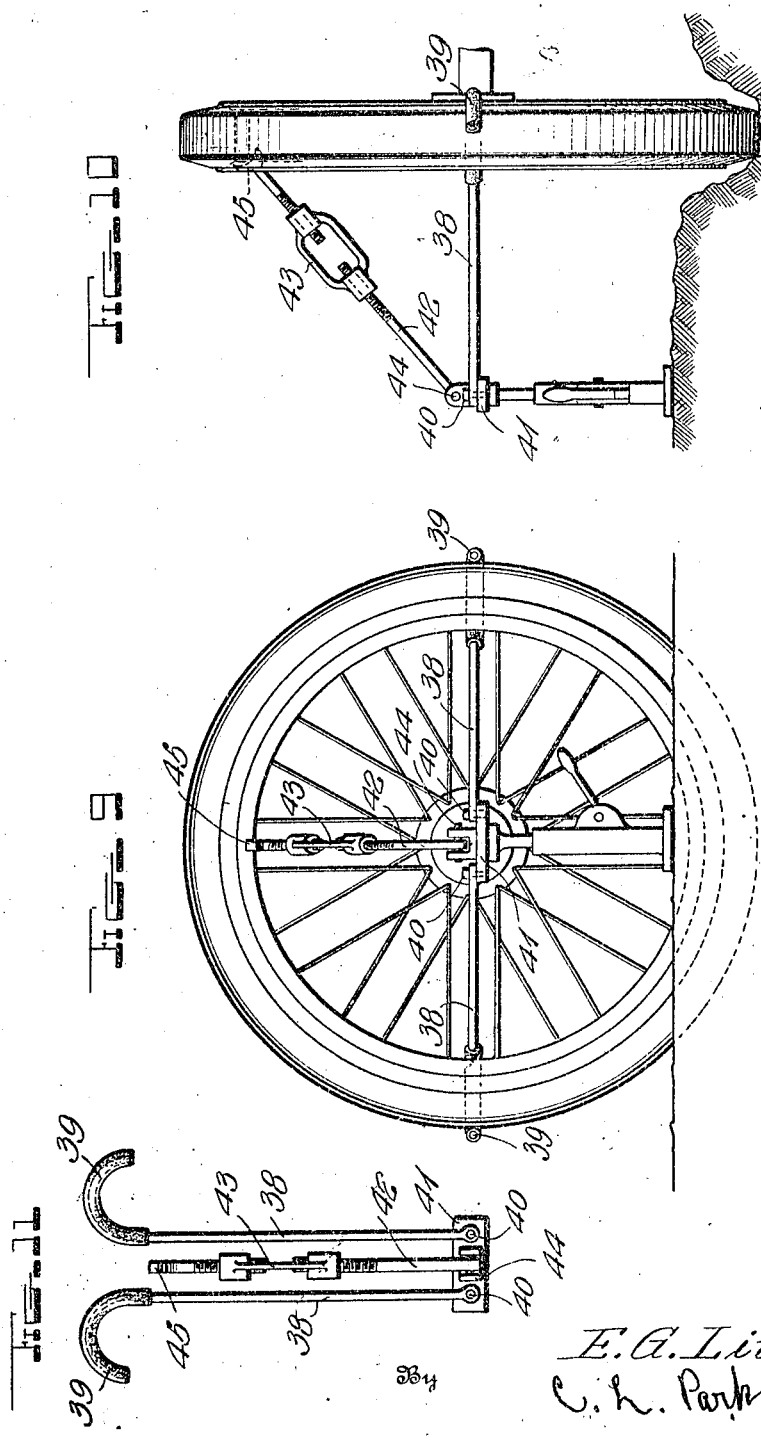

EVERETT G. LIVESAY, OF PRINCETON, WEST VIRGINIA.

VEHICLE-WHEEL-ELEVATING DEVICE.

1,292,823.　　　　Specification of Letters Patent.　　Patented Jan. 28, 1919.

Application filed November 7, 1918.　Serial No. 261,470.

*To all whom it may concern:*

Be it known that I, EVERETT G. LIVESAY, a citizen of the United States, residing at Princeton, in the county of Mercer and State of West Virginia, have invented certain new and useful Improvements in Vehicle-Wheel-Elevating Devices, of which the following is a specification.

My invention relates to apparatus for attachment to the wheel of an automobile or other vehicle, whereby the wheel may be elevated by a jack or the like, when sunk or stuck in the mud or the like.

An important object of the invention is to provide apparatus of the above mentioned character which may be applied to the wheel quickly and conveniently.

A further object of the invention is to provide an attachment of the above mentioned character which may be used in connection with wheels of different sizes.

A further object of the invention is to provide an adjustable support for the jack, whereby its range of operation is increased.

Other objects and advantages of the invention will be apparent during the course of the following description.

In the accompanying drawings forming a part of this specification and in which like numerals are employed to designate like parts throughout the same, Figure 1 is a side elevation of apparatus embodying my invention, parts being shown in section, for the purpose of illustration, Fig. 2 is a transverse vertical sectional view taken on line 2—2 of Fig. 1, Fig. 3 is a side elevation of the inner face of the attaching saddle, Fig. 4 is a horizontal sectional view taken on line 4—4 of Fig. 3, Fig. 5 is a similar view taken on line 5—5 of Fig. 3, Fig. 6 is a side elevation of the adjustable support of a jack, Fig. 7 is an edge elevation of the same, the jack being omitted, Fig. 8 is a horizontal sectional view taken on line 8—8 of Fig. 6, Fig. 9 is a side elevation of a second form of the invention, showing the same applied to a wire wheel, Fig. 10 is an edge elevation of the same, and, Fig. 11 is a plan view of the same, showing the arms collapsed.

In the drawings, wherein for the purpose of illustration is shown a preferred embodiment of my invention, the numeral 10 designates the wheel of an automobile or other vehicle, embodying a hub 11, carrying spokes 12, secured to a felly 13.

My device embodies an attaching saddle 14, formed of a flat plate 15, which is preferably tapered, and provided at its upper end with laterally extending ears 16. A V-shaped flange 17 is rigidly attached to the inner side of the plate 15. This flange is adapted for insertion between a pair of the spokes of the wheel. In order that the attaching saddle may not scratch or mar the spokes of the wheel, I preferably line the inner side of the ears 16 and the outer side of the flange 17, with leather or other suitable material, as indicated at 18.

The numeral 19 designates a substantially horizontal elevating element or bar, provided at one end with a reduced extension 20, for insertion within an opening 21, formed in the plate 15, between the upper ends of the V-shaped flange 17, as shown.

The bar 19 is provided between its ends with a number of upstanding lugs or stops 22, for engagement with a non-extensible flexible element 23, which may be a chain, cable or the like. The element 23, has attaching elements or hooks 24, secured to the ends thereof, adapted to engage with a pair of the lower spokes 12, as clearly illustrated in Figs. 1 and 2. It is thus seen that means is provided to prevent the bar 19 from swinging with respect to the wheel.

The numeral 25 designates an adjustable support for a jack. This support embodies a standard, including a pair of spaced angle-irons 26, affording a passage 27 therebetween. At their lower ends, these angle-irons are bolted to a lug 28, as shown at 29. The lug 28 is carried by a foot or base 20. A lug 31 is arranged between the upper ends of the angle-irons 26 and bolted thereto, as shown at 32.

The numeral 33 designates a vertically adjustable bracket, carrying headed pins 34, adapted to be removably inserted with pairs of key-hole openings 35, which are vertically spaced and formed in corresponding flanges of the angle-irons 26, as shown. The jack 36, which may be of any well known or preferred type, is placed upon the bracket 33, and engages beneath the lower portion of the substantially horizontal bar 19, this bar projecting through the passage 27, as shown. The other flanges of the angle-irons 26 are provided with pairs of vertically spaced openings 37, to receive a removable pin 38, for supporting the bar 19 in the elevated position.

The operation of the apparatus is as follows:

When the wheel of the automobile sinks into the mud or enters a rut or the like, as indicated in Fig. 1, the saddle 14 is placed upon the outer side of the wheel, with the V-shaped flange arranged between a pair of the upper spokes, as clearly illustrated in Fig. 2. The bar 19 is then moved into position and its reduced end 20 inserted within the opening 21 of the saddle. The flexible element 23 is passed over the bar 19 and engages with a selected lug 22, after which the hooks 24 are placed in engagement beneath the proper lower spokes.

The jack support is positioned upon the ground a suitable distance from the wheel, with the bar 19 projecting through the passage 27. The jack is lowered and placed upon the vertically adjustable bracket 33, which is attached to the angle-irons 26 at the proper vertical position. The jack is now operated and raises the bar 19 through the entire throw of the jack. When this is done, the pin 38 is passed through a selected pair of openings 37, to support the bar 19 in the elevated position. The jack is now lowered and the bracket 33 is elevated to bring the lowered end of the jack into contact with the bar 19. The jack may be again operated for lifting the bar 19. It is thus seen that the support for the jack serves to increase its range of operation. When the bar 19 is lifted, a board or the like may be placed under the same, subsequent to which the attachment is removed from the wheel. The automobile may now be operated.

In Figs. 9 to 11 inclusive, I have shown a second form of device, adapted for use in connection with wire wheels. This form of the invention embodies a pair of angularly arranged arms 38, provided at their ends with hooks 39, adapted to encircle the felly and tire of the wheel, thereby attaching the arms to the wheel. Any other suitable means may be employed to connect the arms 38 with the wheel at or near its felly. The arms 38, at their opposite ends, are pivotally connected, as shown at 40, with a plate 41.

The numeral 42 designates a diagonal brace arm, which is longitudinally adjustable, the same being equipped with a turnbuckle 43, for this purpose. The outer end of the arm 43 is pivoted to the plate 41, as shown at 44. The inner end of the arm 42 is provided with a saddle 45, to engage with the felly of the wheel, as shown.

In the use of this form of the invention, the device is applied to the wheel, as shown in Figs. 1 and 2. The jack is arranged beneath the plate 41. Upon operating the jack, the wheel will be lifted, as is obvious.

It is to be understood that the forms of my invention herewith shown and described are to be taken as preferred examples of the same, and that various changes in the shape, size, and arrangement of parts may be resorted to, without departing from the spirit of the invention or the scope of the subjoined claims.

Having thus described my invention, I claim:

1. In apparatus of the character described, an approximately horizontal lifting member to be arranged upon the outer side of the wheel of an automobile and disposed at a right angle thereto, a standard having a longitudinal passage for receiving the outer end of the lifting member, a bracket vertically adjustably mounted upon the standard, a jack arranged upon the bracket and engaging the lifting member, and a supporting element to engage with the lifting member and adapted to be secured to the standard at vertically spaced points.

2. In apparatus of the character described, a saddle adapted to engage with the spokes of a wheel, a bar having one end thereof readily detachably connected with the saddle and provided between its ends with a stop element, a flexible element adapted to be passed about the bar and engage with the stop element, and attaching devices secured to the ends of the flexible element to engage with the spokes of the wheel.

3. In apparatus of the character described, a plate having an opening formed therein and adapted to be placed in contact with the sides of certain spokes of a lateral wheel, a V-shaped flange secured to the contacting side of the plate to be inserted between such spokes, a bar having one end thereof adapted for removable insertion within the opening of the plate and provided with stop elements arranged between the ends thereof, a flexible element to be passed about the bar and engaging with a selected stop element, and attaching devices secured to the ends of the flexible element to engage with certain spokes of the wheel.

4. Apparatus of the character described comprising, a substantially flat plate to be arranged upon one side of the wheel and contact with the spokes thereof and being free from connection therewith, a laterally extending flange carried by the plate and projecting into the space between the spokes to prevent lateral displacement of the plate, an approximately horizontal lifting member arranged upon one side of the plate and connected therewith, and an inclined member engaging the lifting member and having means to engage with the wheel at points disposed upon one side of the lifting member and spaced from the same.

5. Apparatus of the character described comprising, a substantially flat plate to be arranged upon one side of the wheel and contact with the spokes thereof and being free from connection therewith, a laterally extending flange carried by the plate and projecting into the space between the spokes to prevent lateral displacement of the plate, an approximately horizontal lifting member arranged upon one side of the plate and detachably secured thereto so that it may be readily separated therefrom, and an inclined member detachably engaging the lifting member at a point spaced from said plate and having means for detachable engagement with the spokes of the wheel.

In testimony whereof I affix my signature.

EVERETT G. LIVESAY.